United States Patent Office 3,371,480
Patented Mar. 5, 1968

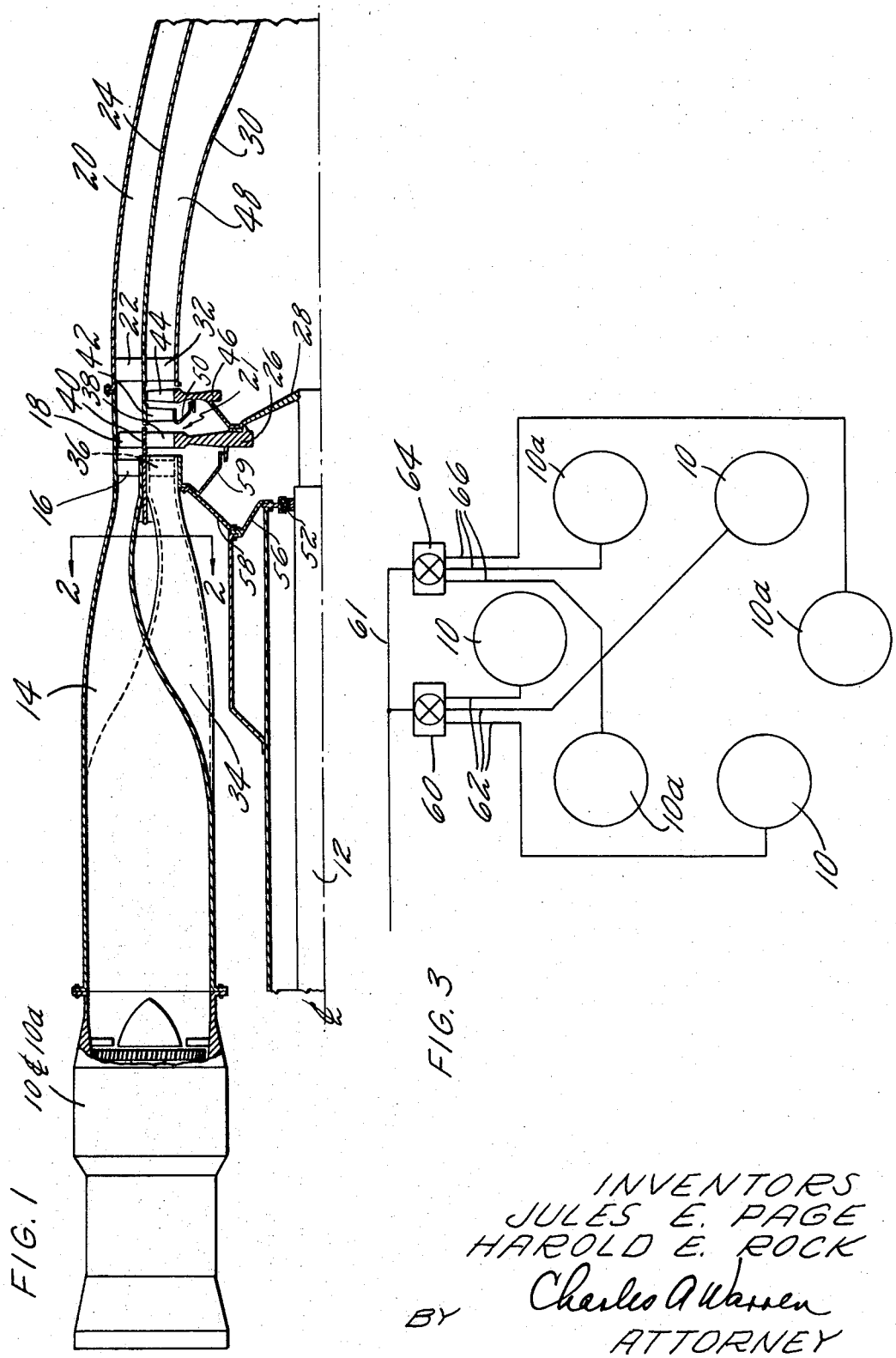

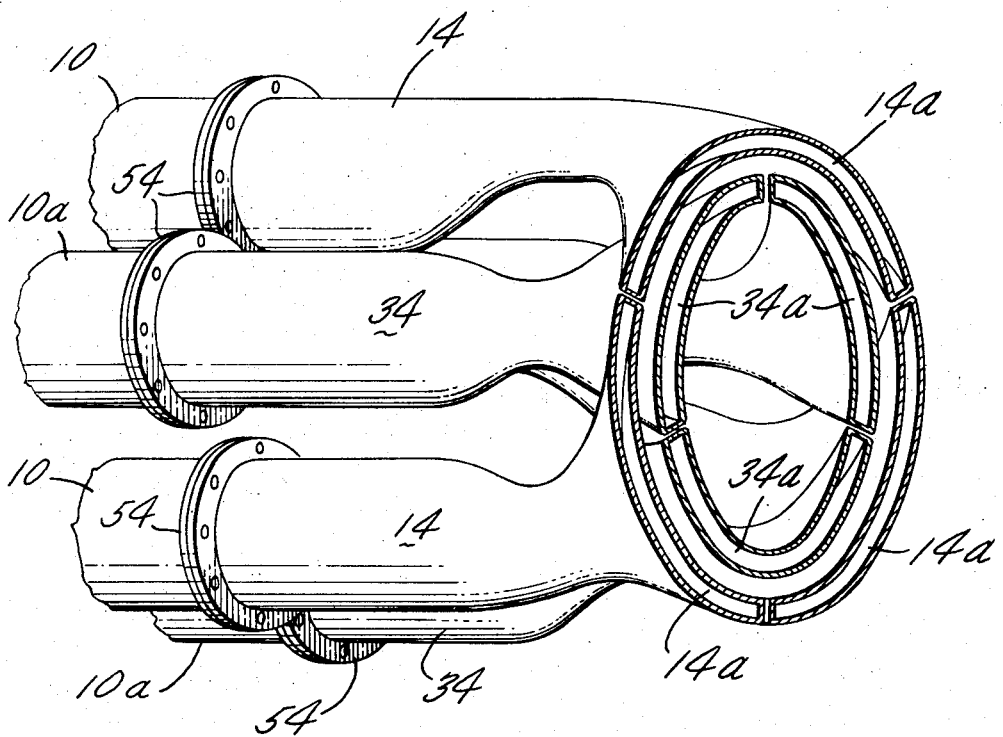

3,371,480
ONE AND ONE-HALF STAGE SPLIT
TURBINE CONSTRUCTION
Jules E. Page, Wapping, and Harold E. Rock, Hartford, Conn., assignors to United Aircraft Corporation, East Hartford, Conn., a corporation of Delaware
Filed June 16, 1966, Ser. No. 558,090
6 Claims. (Cl. 60—39.16)

ABSTRACT OF THE DISCLOSURE

A one and one-half stage split turbine construction wherein the turbine operates efficiently at full power and wherein the turbine efficiency is maximized at the partial admission condition when alternate gas generators are shut down.

This invention relates to gas turbine powerplants having two annular flow paths through the turbine and more specifically to a multi-stage split turbine construction.

Use of a cluster of small gas generators to provide motive fluid for a power turbine has certain advantages over a single large gas generator. By using a cluster of gas generators to provide the motive fluid the thrust or power output to weight ratio of the device can be kept high. In conventional powerplants having a plurality of independently operable gas generators feeding into a power turbine, the general practice is to divide the power turbine nozzle circumferentially into equal segments, depending on the number of gas generators, for the purpose of allowing each gas generator to provide the motive fluid for its respective circumferential segment of the power turbine.

In such a design, when one or more of the gas generators is shut down, for example when operating at part load buffeting of the turbine blades occurs due to the intermittent filling and emptying of the spaces between the blades as the blades rotate through the zones of high and low pressure as in a partial admission turbine. A feature of this invention is to have the turbine operate as a full admission turbine even at part load and/or with some of the gas generators out of operation.

In the design of a VTOL aircraft, where analysis showed that if, for example, 6 gas generators were necessary to provide the maximum power required during aircraft takeoff, only 3 gas generators were necessary to provide the energy required during aircraft operation in level flight. A conventional power turbine designed for either the maximum or reduced power condition would be inefficient at the other off-design condition. Another feature is a turbine construction for efficient operation at either the full load for takeoff or the part load in cruise operation.

One feature of this invention is a novel 1½ stage power turbine having inner and outer concentric rows of nozzle vanes and wherein motive fluid flows through both the outer and inner row of turbine nozzles efficiently at maximum power and wherein the flow of motive fluid is directed solely to the inner turbine nozzles during cruise operation with a minimum effect on the efficiency of the turbine.

Another feature of this invention is a split flow power turbine which operates efficiently at two distinctly different design points. This feature provides efficient operation at both design points and avoids buffeting of the turbine blades.

Other objects and advantages of this invention will be apparent from the specification and claims and from the accompanying drawing which illustrates an embodiment of this invention.

FIGURE 1 is a schematic view partly in section showing a gas turbine powerplant embodying the invention.

FIGURE 2 is a perspective view of the communicating ducts which supply the motive fluid to the turbine nozzles.

FIGURE 3 is a diagrammatic view showing a means of controlling the fuel flow to the gas generators.

Referring to FIGURE 1, although a single gas turbine generator 10 is shown in this figure for simplicity, it is understood that a number of generators 10 and 10a are arranged in alternating arrangement, FIG. 2, in a cluster around the power turbine shaft 12. The motive fluid from alternate gas generators 10 flows through ducts 14 to an outer row of turbine nozzles 16 thereafter and the motive fluid expands through the outer tier 18 of the two tier turbine blades 21 thereby driving the turbine disc 26 which is connected to the power shaft 12 through a mounting flange 28. After expansion in the outer tier 18 of the turbine blades, the motive fluid passes into an outer exhaust duct 20. Struts 22 support the inner tailpipe 24 forming the inner wall of duct 20 within the outer wall 25. The tailcone 30 is supported through inner struts 32 in spaced relation to the tailpipe.

Similarly, the remaining gas generators 10a supply the motive fluid through communicating ducts 34 to the inner turbine nozzels 36. The inner turbine nozzles 36 direct the motive fluid onto the inner tier 38 of the two tier blades 21. Expansion of the motive fluid in the inner tier 38 of the two tier blades imparts additional force to the turbine disc 26 which is carried through flange 28 to the rotor shaft 12. Second stage turbine nozzles 42 are provided downstream of the blades 21 to direct the fluid against a second stage of turbine blades 44 after which the fluid passes into inner exhaust duct 48. The force imparted to the turbine blades 44 which are connected to the turbine disc 46 is carried through flange 28 to the rotor shaft 12. Shrouds 40 on the two tier blades 21 separate the flow of motive fluid between the inner and outer ducts.

Second stage inner nozzles 42 are supported from a forward extension of inner tailpipe 24. From said second stage inner nozzles 42, are supported sealing means 50. Main bearing 52 rotatably supports the rotor shaft 12. The main bearing 52 in turn is supported through flanges 56 and 58 from the inner nozzles 36. From said flange 58 is supported sealing means 59.

In FIGURE 2, alternate gas generators 10 are mounted, one to each of the flanges 54 of the outer ducts 14 while the remaining alternate gas generators 10a are mounted to flanges 54 of the inner ducts 34. Ducts 14 gradually merge into sectors 14a which together form an annular passage for the outer duct which leads to the outer turbine nozzles 16 and the ducts 34 similarly merge into sectors 34a forming an inner annular passage for the inner duct leading to the inner turbine nozzles 36.

It will be apparent that this 1½ stage power turbine operates efficiently when motive fluid flows to the outer and inner turbine nozzles. It is also apparent that the gas generators supplying motive fluid to the outer nozzles can be shut down such that the flow in the outer ducts is essentially eliminated while the flow of motive fluid passing through the inner ducts containues to efficiently impart energy to the turbine rotor.

Control means to monitor this system must be provided. In FIGURE 3, a control system including a valve 60 regulates the flow of fuel through fuel lines 62 to the alternate gas generators 10 which supply the motive fluid to the outer turbine nozzles 16. An additional control system including control valve 64 regulates the flow of fuel to the gas generators 10a which supply the motive fluid to the inner turbine nozzles 36. In operation, control valve 60 directs fuel from the main fuel line 61 into the fuel lines 62 to the gas generators 10. At the same time, valve 64 directs fuel from line 61 through fuel lines 66 to the gas generators 10a. When reduced power is desired, the pilot actuates valve 60 so that the gas generators 10 are uniformly shut down. Since reduced power is desired, the pilot does not close off valve 64 so that the gas generators 10a continue to supply the motive fluid to the inner nozzles 36.

In this invention, the 1½ stage power turbine does not experience buffeting at the high power or reduced power condition since the flow leading to the turbine in the inner or outer ducts is uniform in the plane of rotation. In effect, there can be either full admission to the outer turbine nozzles during maximum power operation or no admission to the outer nozzles during reduced power operation.

It is to be understood that the invention is not limited to the specific embodiment herein illustrated and described but may be used in other ways without departure from its spirit and claims.

What is claimed is:

1. A gas turbine powerplant including a plurality of ducts supplying motive fluid, concentric annular turbine nozzles and a two stage power turbine; some of the ducts supply motive fluid to the outer turbine nozzles and the remainder of the ducts supplying motive fluid to the inner turbine nozzles, and downstream of said turbine nozzles a two stage turbine rotor coaxial with said annual turbine nozzles, one stage of the turbine rotor supporting two tier blades with one tier extending across the inner flow path and the other tier extending across the outer flow path, the other stage of the turbine rotor supporting a single tier blade extending across the inner flow path only and means to close off the motive fluid to the outer turbine nozzles.

2. A powerplant as in claim 1, wherein a second nozzle ring is located between the first and second stage turbine blades in the inner duct.

3. A powerplant as in claim 1, wherein a second nozzle ring is located between the first and second stage turbine blades in the inner duct and a shroud ring on the two tier blades dividing the flow paths between the inner and outer ducts.

4. A gas turbine powerplant including a plurality of gas generators, a plurality of ducts connected to the gas generators and receiving motive fluid therefrom, concentric annular turbine nozzles, and a two stage power turbine; some of the gas generators supplying motive fluid through connecting ducts to the outer turbine nozzles, and the remainder of the gas generators supplying motive fluid through connecting ducts to the inner turbine nozzles, and downstream of said turbine nozzles a two stage rotor coaxial with said annular turbine nozzles, one stage of the turbine rotor supporting two tier blades with one tier extending across each flow path and the other stage of the turbine rotor supporting a single tier blade extending across the inner flow path only and means to close off the motive fluid to the outer turbine nozzles.

5. A powerplant as in claim 4, wherein a second nozzle ring is located between the first and second stage turbine blades in the inner duct.

6. A powerplant as in claim 4, wherein a second nozzle ring is located between the first and second stage turbine blades in the inner duct and a shroud ring on the two tier blades to divide the flow paths between the inner and outer ducts.

References Cited
UNITED STATES PATENTS

| 2,526,281 | 4/1947 | Ryan et al. | 253—65 |
| 2,540,526 | 2/1951 | Howell | 60—39.37 |
| 2,675,195 | 4/1954 | Herrick | 60—39.37 X |

FOREIGN PATENTS

| 656,930 | 9/1951 | Great Britain. |

JULIUS E. WEST, *Primary Examiner.*